United States Patent [19]
Gruber

[11] Patent Number: 5,364,191
[45] Date of Patent: Nov. 15, 1994

[54] PIVOT BEARING

[75] Inventor: Walter Gruber, Weinheim, Germany

[73] Assignee: Firma Carl Freudenberg, Weinheim/Bergstr., Germany

[21] Appl. No.: 28,416

[22] Filed: Mar. 9, 1993

[30] Foreign Application Priority Data

May 2, 1992 [DE] Germany .............................. 4216559

[51] Int. Cl.⁵ ...................... F16C 23/04; F16C 27/06; F16C 33/74
[52] U.S. Cl. ................................ 384/203; 384/206; 384/153
[58] Field of Search ........ 354/192, 202, 203, 206–213, 354/215, 130, 140, 147, 151, 153

[56] References Cited

U.S. PATENT DOCUMENTS

| 2,381,391 | 8/1945 | Brown | 384/203 |
| 2,606,795 | 8/1952 | Hutton | 384/203 |
| 2,855,232 | 10/1958 | Kozak | 384/203 X |
| 3,522,975 | 8/1970 | White | 384/207 X |
| 4,111,499 | 9/1978 | McCloskey | 384/192 |
| 5,058,867 | 10/1991 | Hadano et al. | 384/203 X |

FOREIGN PATENT DOCUMENTS 2752456 5/1979 Germany .............................. 384/206

Primary Examiner—Thomas R. Hannon
Attorney, Agent, or Firm—Felfe & Lynch

[57] ABSTRACT

A guiding ring (4) having a spherical inside surface is supported inside an annular rubber cushion (3) which in turn is supported inside a metal case (1). A body (2) having a spherical outer surface cooperates with the inner surface of the ring to permit rotational movement. Bellows (5) attached to axial abutments (6,7) of the case protect the joint from abrasive elements. The case is preferably in two parts which are press fit together, the rubber cushion being fixed inside one of the parts.

10 Claims, 5 Drawing Sheets

PIVOT BEARING

BACKGROUND OF THE INVENTION

The invention relates to a pivot bearing including a spherical body held in a case, the spherical body being supported in the housing by a ring-like cushion of rubber.

A pivot bearing of this kind is disclosed in U.S. Pat. No. 4,883,263, which is incorporated herein by reference. The pivot bearing is configured as a bearing for axle supports, steering gear or the like in motor vehicles, and has a spherical body which rigidly surrounds a link pin circumferentially. Between the case and the link pin is a sleeve-like link body of elastomeric material under radial bias. At both ends of the elastomeric link body there are supporting rings by which it is held in the case and which simultaneously provide a limit for the deflection movements. The dynamic characteristics of this pivot bearing are not very satisfactory; swiveling angles of more than 10° and low-force swiveling movement cannot be achieved. Furthermore, due to the configuration of the rubber cushion the properties of isolating vibrations produced in operation are not very satisfactory.

SUMMARY OF THE INVENTION

The invention is addressed to the problem of improving the prior art pivot bearing so that swiveling angles of more than 10° can be executed with particularly low force, and so that the pivot bearing will have improved properties for the isolation of vibrations produced in operation.

According to the invention, a spherical body (a body having a spherical outside surface) is supported inside the rubber cushion by a guiding ring of a hard material, and the body is sealed by at least one bellows fixed to the case. The pivot bearing has good dynamic characteristics over a long useful life. Wide swiveling angles can be worked with low force, and the bearing has good properties for isolation of vibrations produced in operation. The pivot bearing is used with preference in the area of wheel guiding elements and the steering of motor vehicles. In operation, not only great forces are produced in the axial and radial direction but also great movements in the linkages. The pivot bearing according to the invention can withstand extreme conditions and can absorb, for example, high axial forces of more than 0.5 kN, great radial forces of more than 1 kN, and very great deflection angles of more than 10° produced under low force. Due to the bellows which seals the case from the spherical body, very good dynamic characteristics are assured over a long period of use. The pivot bearing is thus well protected against external influences.

Since the guiding ring, which has a spherical inside surface facing the spherical outside surface of the body, has a lesser axial length than the spherical body, an excellent angular mobility is assured.

According to an advantageous embodiment, the confronting surface areas of the guiding ring and/or of the spherical body are provided with a friction-reducing surface coating such as PTFE, or the guiding ring itself is made of glass fiber-reinforced PTFE. A good low-force relative mobility between the guiding ring and the spherical body partially covered by the guiding ring is thereby achieved while avoiding life-shortening wear. As regards especially simple, low-cost manufacture, the guiding ring can consist of glass fiber-reinforced polytetrafluoroethylene. In addition to good dynamic characteristics, such a pivot bearing is distinguished by a comparatively low mass. The guiding ring and the cushion can be joined together with an adhesive.

The rubber cushion can have a substantially rectangular cross section with a radial thickness and an axial width, the ratio of the radial thickness to the axial width amounting to 1:1 to 1:4. Such a ratio has good dynamic characteristics. On the one hand, such a rubber cushion assures good isolation of vibrations caused by operation combined with sufficient cushioning of the case on the spherical body both radially and axially, and on the other hand a precise positioning of the relatively moving parts of the pivot bearing.

In an advantageous embodiment provision is made for the rubber cushion to be contained in a case of pot-shaped cross section. The case can be divided axially and can be bipartite, while the cushion is fastened with adhesive at least within the radial boundary of the case. The case can be formed, for example, by two substantially L-shaped parts, one of the L-shaped parts being locked or fastened around the other. For the sake of ease of manufacture and assembly, the cushion can be vulcanized onto the case part that is next to the spherical body. The bonding of the cushion to the case part can be performed along its entire inside or only in the area of the cylindrical surface of the relatively interior part of the case. If the cushion is bonded only to the cylindrical surface and not in the areas of the case that extend radially, a gap can be provided between the cushion and the lateral inside face of the case by controlling the shrinkage due to vulcanization of the cushion. The isolation of high-frequency vibrations is then especially effective.

To limit relative displacements of the case in the axial direction against the spherical body, the case can have on both sides in the area of its lateral inside faces inwardly facing abutment flanges, and the abutment flanges can be of such a shape and size that they serve simultaneously as security against loss in the event of the damage or destruction of the rubber cushion.

The abutment flange, which can be formed by the lateral faces of the case, can advantageously have for the purpose an inside diameter that is greater than the outside diameter of the spherical body and smaller than the greatest outside diameter of the guiding ring.

The case can have holding means at its lateral faces in which the bellows is held. With an eye to low manufacturing costs and ease of assembly, it is advantageous for the holding means and the abutment flange to be merged into one piece and form components of the case. The three-fold function of the case combined with ease of manufacture is of outstanding importance. The radially inward facing surfaces of the case parts can for that purpose be rounded by more than 90° by axially rolling the material. This rounding extends over the entire circumference, so that on the one hand the case is supported against axial movement by the cushion held by the joint and an abutment flange function is produced combined with security against loss, and that on the other hand the rolled margin of the axial abutment flanges serves to hold the bellows which protects the ball joint against contamination and wear.

DETAILED DESCRIPTION OF THE PREFERRED EMBODIMENT

Figure 1:
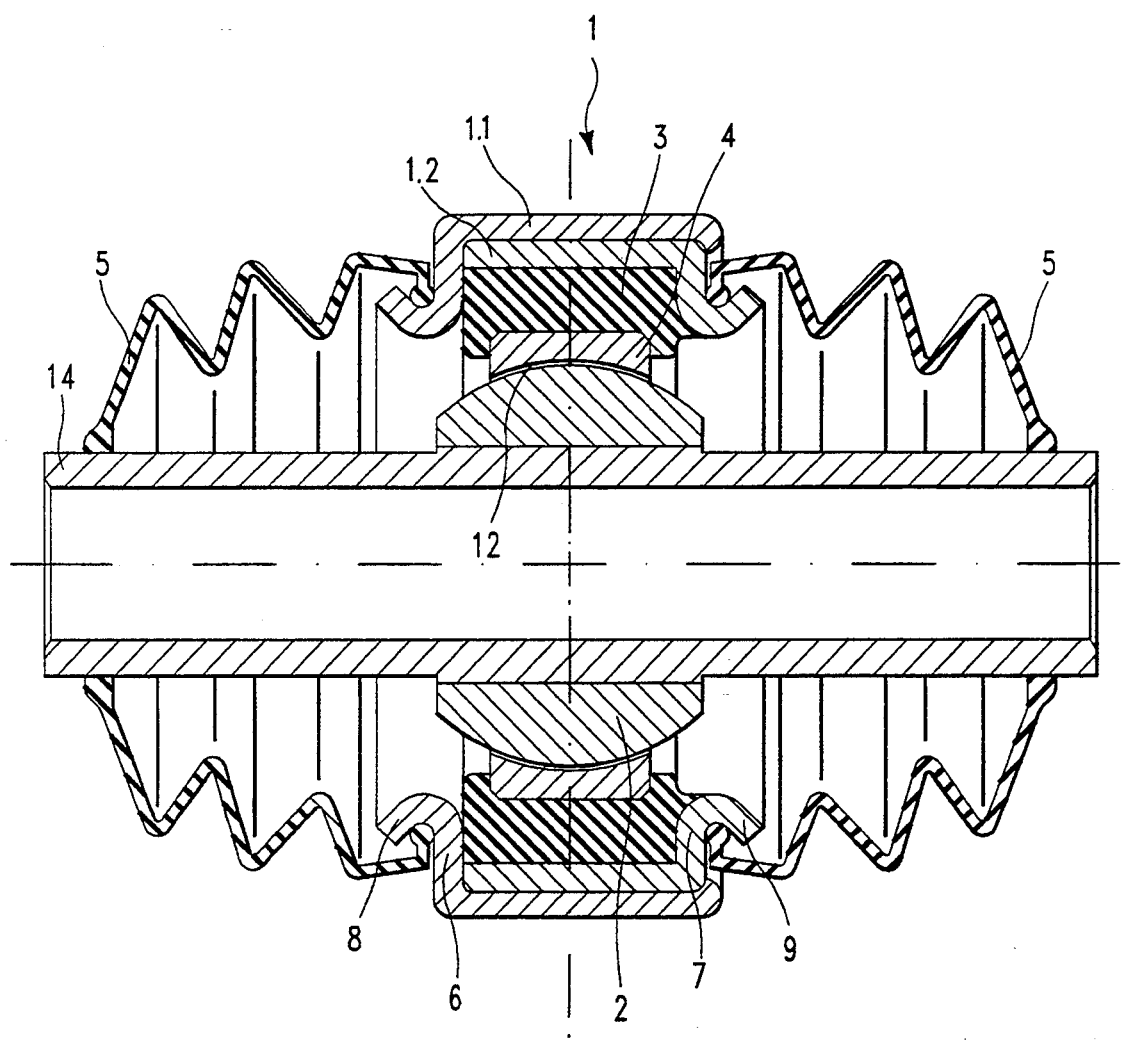
FIG. 1 is an axial cross-section of a first embodiment of pivot bearing.

In FIGS. 1 to 4 embodiments are shown of pivot bearings which consist essentially of a case 1, a spherical body 2 fixed to a sleeve 14, a cushion 3 of rubber, and a guiding ring 4 of a hard material. The case 1 in the embodiments is bipartite, the two parts 1.1 and 1.2 collectively having an essentially pot-like cross section. The spherical body 2 is carried in a guiding ring 4 with a spherical inside surface, both the body 2 and the ring 4 being a hard metal such as steel, one of the body 2 and the ring 4 having an antifriction coating 12 such as PTFE thereon. Alternatively, the one of the body 2 or ring 4, preferably ring 4, is of a bronze alloy of low friction characteristics, or of a plastic, preferably glass-fiber reinforced PTFE. The rubber cushion 3 is ring-shaped and surrounds the guiding ring with radial bias. The cushion is vulcanized at least to the cylindrical portion of the case 1 and, to avoid tensions that might reduce useful life, it is gauged when the bearing is assembled. The case 1 has holding means 8 and 9 on both sides, in each of which one axial end of a bellows 5 is held. The other axial end of the bellows encircles with radial bias the circumference of a mounting means that is used. The bellows 5 protects the ball joint against dirt and wear and thereby assure low-friction relative movement even under unfavorable conditions of use, and thus assures good dynamic characteristics over a long period of use.

The embodiment shown in FIG. 1 has a case 1 of pot-shaped cross section, which consists of two case parts 1.1 and 1.2 each. The rubber cushion 3 is vulcanized in the case part 1.2 at the radially inward pointing limb of the abutment flange 6 and at the radial, cylindrical wall. Case part 1.1 is pressed axially onto case part 1.2 and beaded inward on the side facing away from the abutment flange 7. The case 1 is gauged during manufacture so as to reliably prevent tensions within the cushion 3. The cushion 3 and the guiding ring 4 can be joined together by adhesive in order to simplify assembly of the pivot bearing.

Figure 2:
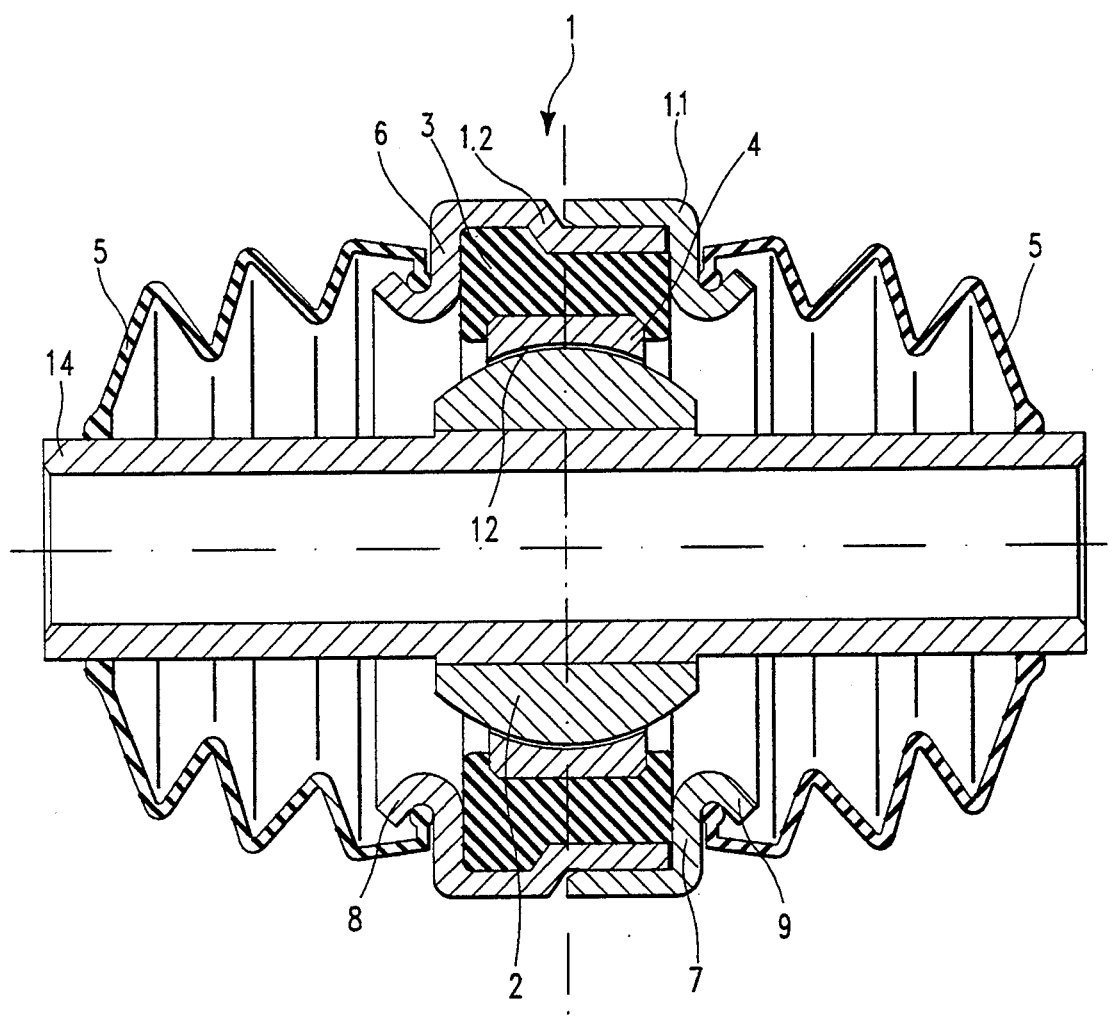
FIG. 2 is an axial cross-section of a second embodiment of pivot bearing.

In FIG. 2 there is shown a pivot bearing in which the cushion 3 is first vulcanized in tubular form and then forced in between the guiding ring 4 and the case 1. To simplify manufacture, the case part 1.2 is undercut in the axial direction. This configuration results in a relatively reduced case diameter in comparison to the embodiment in FIG. 1. After the cushion 3 has been forced between case part 1.2 and guiding ring 4, case part 1.1 can be pressed axially on to part 1.2 and thus forms the second axial abutment flange 7.

Figure 3:
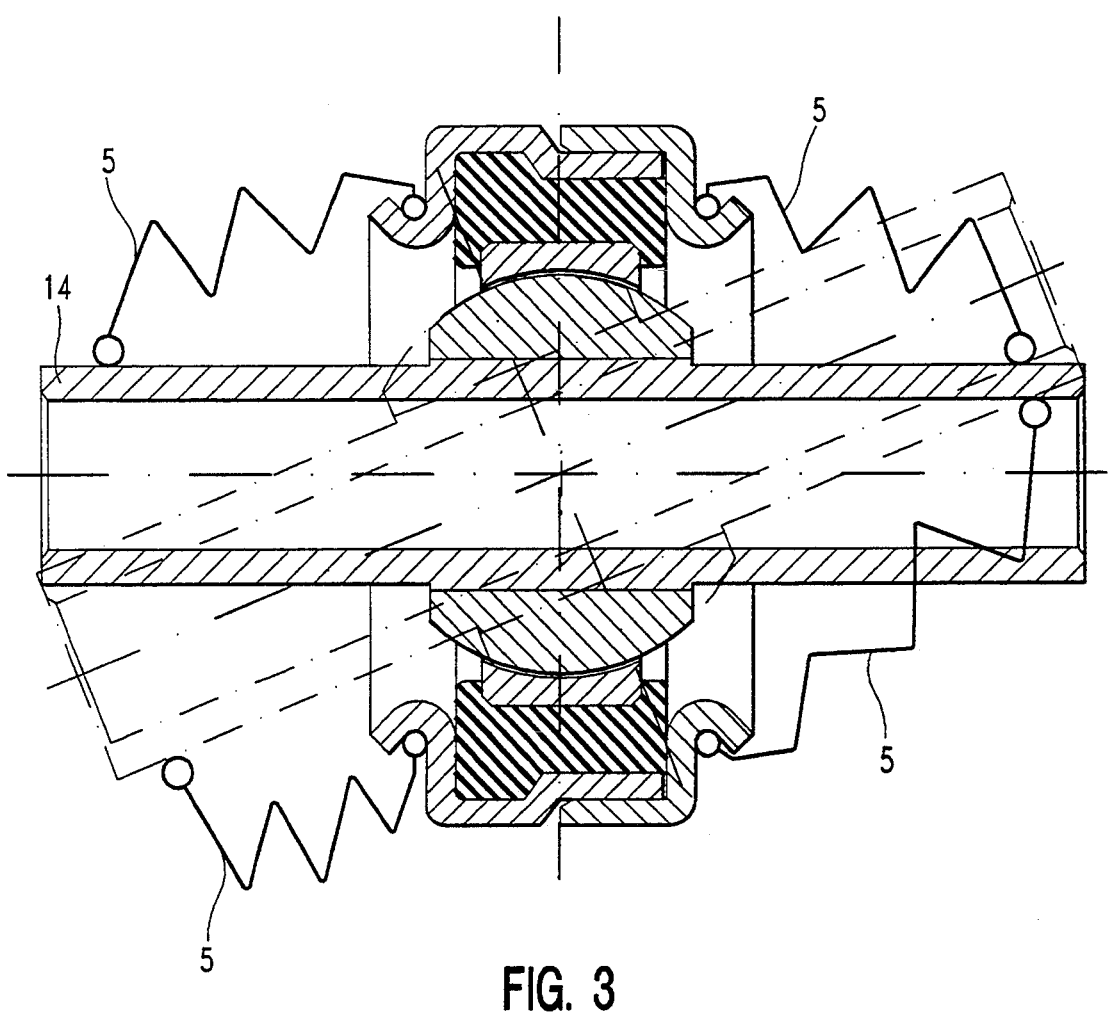
FIG. 3 is a view similar to FIG. 3 showing the bearing swivelled to maximum deflection.

In FIG. 3 is shown the pivot bearing from FIG. 2, wherein the maximum deflection of the sleeve 14 in the bearing is represented in broken lines. The bellows 5 is able to follow the deflections of the pivot bearing without relative movement at its points of attachment.

Figure 4:
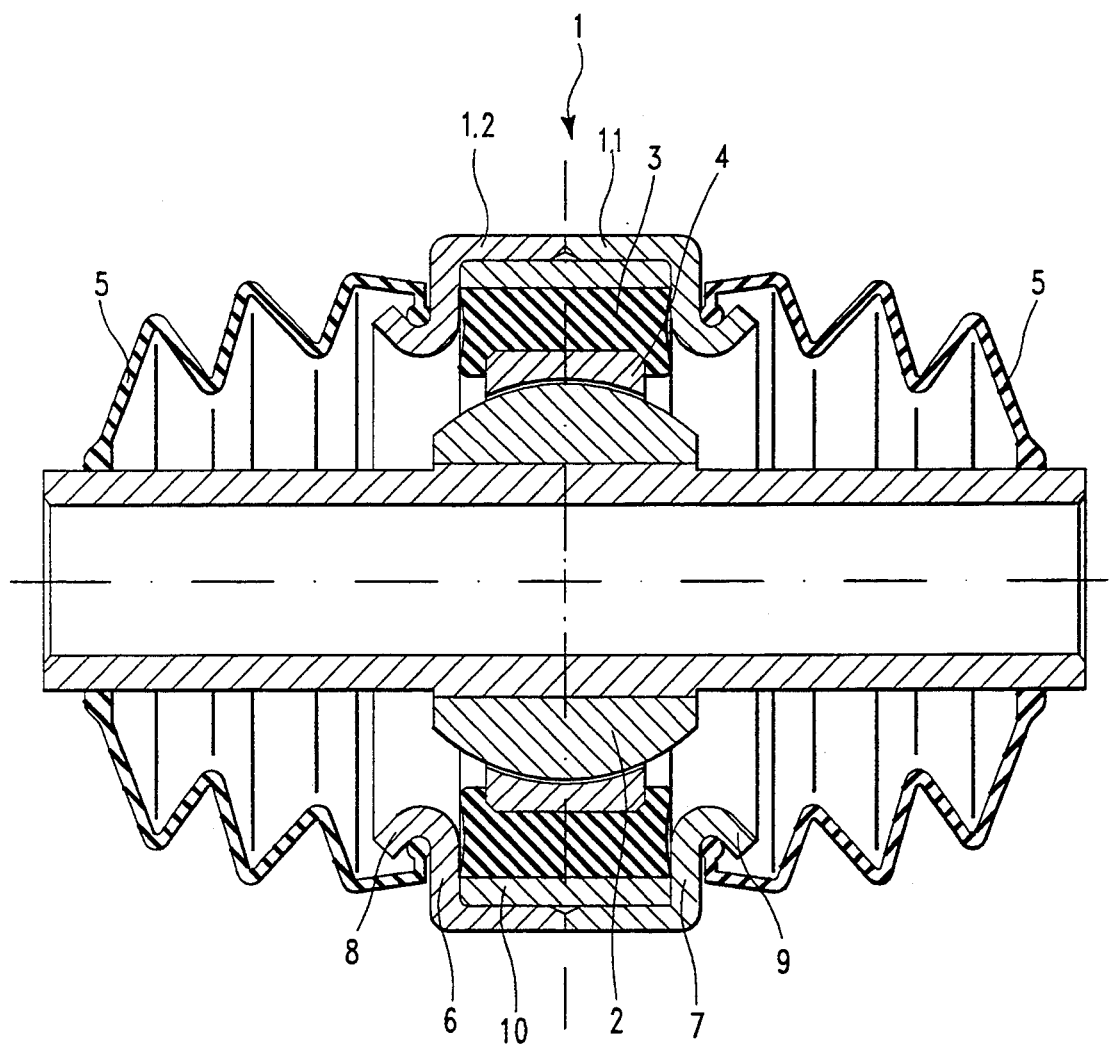
FIG. 4 is an axial cross-section of a third embodiment of pivot bearing.

In FIG. 4 is shown a pivot bearing which is vulcanized only along the radial surface of the case 1. In the area of the abutment flanges 6 and 7 the cushion 3 is not bonded to the case. By means of vulcanization shrinkage the cushion 3 can, as shown in this example, define a gap with the abutment flanges 6 and 7, resulting in better isolation of high-frequency vibrations. In this example the two case parts 1.1 and 1.2 are made symmetrical with one another, resulting in further simplified manufacture. The rubber cushion 3 is surrounded with radial bias on its circumference by a holding ring 10 which is held in case 1 by friction on the side facing away from the cushion 3.

In the embodiments of FIGS. 1–4, the case 1 is typically fixed to the body of an automobile and the sleeve 14 accommodates a tie rod of the steering system.

Figure 5:
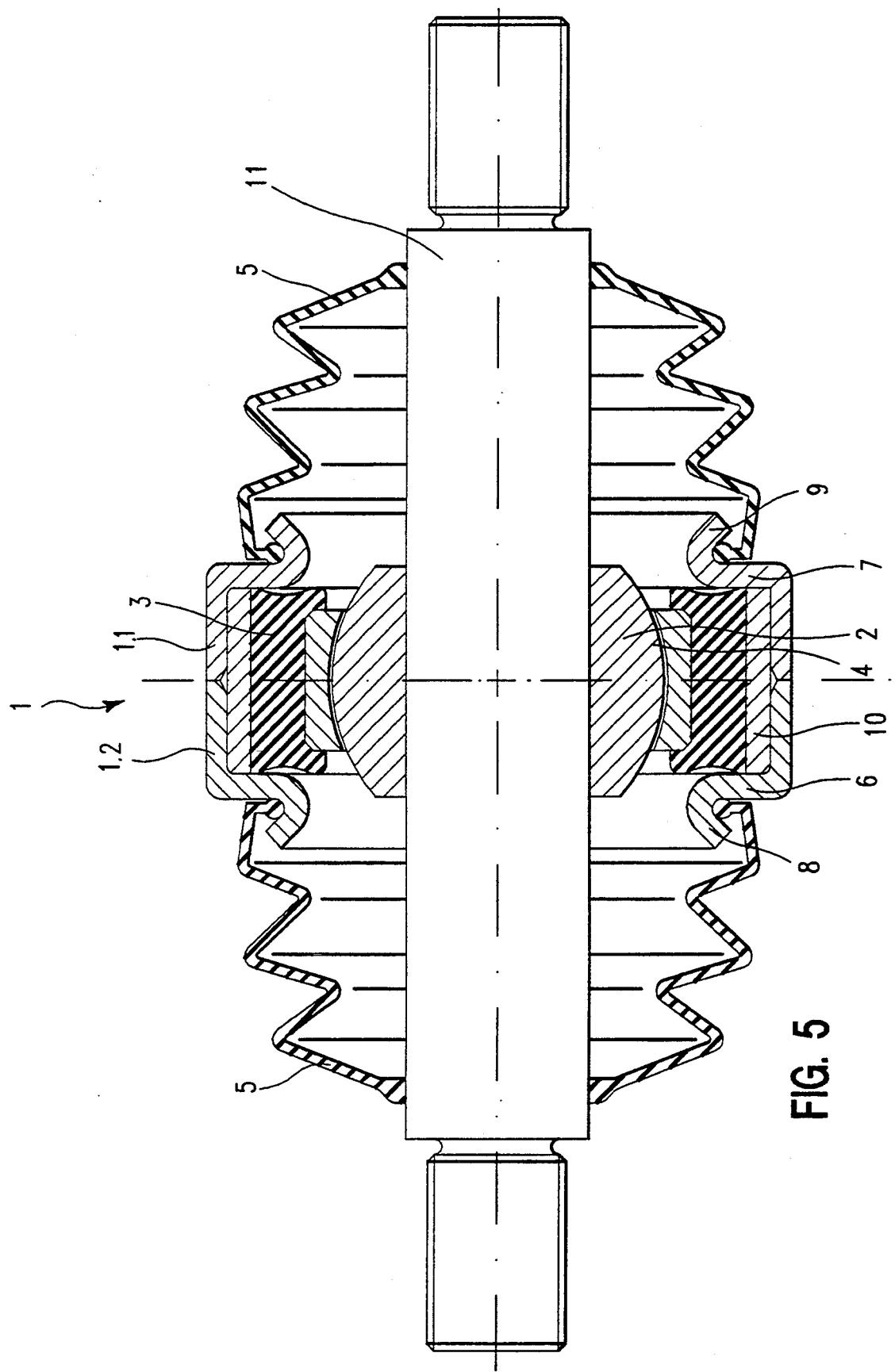
FIG. 5 is similar to FIG. 4 but shows a threaded shaft instead of a tube.

The pivot bearing of FIG. 5 differs from that in FIG. 4 only in its central mounting. The spherical body 2 in this example circumferentially surrounds a pin 11 and is associated with the latter in a rigid manner. The pin 11 has a screw thread at both its extremities in the axial direction, to which wheel guiding means of motor vehicles can be fastened.

I claim:

1. Pivot bearing comprising
   a case comprising two parts, each part having a cylindrical inside surface and a cylindrical outside surface, the inside surface of one of said parts being fit on the outside surface of the other of said parts,
   a rubber cushion of annular shape positioned against the inside surface of the other of said parts, said cushion having a central axis,
   a guiding ring coaxially inside said rubber cushion, said guiding ring having a spherical inner surface, and
   a body having a spherical outer surface which cooperates with said inner surface of said ring to permit rotational movement.

2. Pivot bearing as in claim 1 further comprising a friction reducing coating on at least one of said spherical inner surface and said spherical outer surface.

3. Pivot hearing as in claim 1 wherein said guiding ring is made of glass fiber reinforced PTFE.

4. Pivot bearing as in claim 1 wherein said rubber cushion has a rectangular cross-section having a radial extent perpendicular to said axis and an axial extent parallel to said axis.

5. Pivot bearing as in claim 1 wherein said case parts each have an annular flange which extends radially inward toward said axis.

6. Pivot bearing as in claim 5 wherein said guiding ring has an outside diameter, said spherical body likewise having an outside diameter, said abutments each having an inside diameter which, relative to said axis, lies between said outside diameter of said guiding ring and said outside diameter of said spherical body.

7. Pivot bearing as in claim 5 further comprising bellows protecting said body, said abutments having holding means for fixing said bellows to said case.

8. Pivot bearing as in claim 1 further comprising a bellows protecting said body, said case having holding means for fixing said bellows to said case.

9. Pivot bearing as in claim 1 wherein said rubber cushion is vulcanized to said inside surface of the other of said parts.

10. Pivot bearing as in claim 1 wherein said one case part is pressed axially onto said other case part.

* * * * *